United States Patent Office 3,005,236
Patented Oct. 24, 1961

3,005,236
PROCESS FOR STRETCHING POLYCARBONATE FILAMENTS AND FILMS AT TEMPERATURE AT WHICH TANGENT OF DIELECTRIC LOSS ANGLE IS MAXIMUM
Alfred Reichle and Hanns Wilsing, Dormagen, Germany, assignors to Farbenfabriken Bayer Aktiengesellschaft, Leverkusen, Germany, a corporation of Germany
No Drawing. Filed Nov. 8, 1960, Ser. No. 67,893
Claims priority, application Germany Nov. 21, 1959
1 Claim. (Cl. 18—48)

The present invention relates to a process for the production of shaped elements from polycarbonates with a particularly high tensile strength, stretching being carried out in a quite specific temperature range.

It is already known that shaped elements of thermoplastic polycarbonates of high molecular weight and having improved tensile strength can be produced by stretching (see Belgian Patent No. 564,009). According to this process, the shaped elements, consisting of crystallisable polycarbonates, are stretched in a temperature range between the second order transition temperature and the melting point. It is preferred to use temperatures which are 20–30° C. higher than the second order transition temperature. However, no preferred temperature is specified as the optimum stretching temperature within the indicated general range.

It is an object of the present invention to provide a stretching process for shaped elements of thermoplastic polycarbonates which enables particularly high tensile strengths to be produced. An additional object is to enable the conventional stretching devices to be employed for this process. Yet another object is to make it possible to use the process without any difficulty for any desired polycarbonate.

Other objects will be apparent from the following description and the examples.

It has now been found that shaped elements, such as filaments and foils, consisting of thermoplastic polycarbonates of high molecular weight and having particularly high tensile strength can be obtained by stretching at temperatures above the second order transition temperature and below the melting point if the stretching is carried out just in the narrow temperature range in which the tangent of the dielectric loss angle is at a maximum. This physical characteristic value can be determined by the method described by F. Krum and F. H. Muller (Kolloid Zeitschrift, vol. 2, June 1959).

It could not in any way be foreseen that for stretching shaped elements of polycarbonates between the second order transition temperature and the melting temperature, there would exist a quite specific narrow temperature range in which maximum tensile strengths can be produced. These optimum stretching temperatures are also by no means within the temperature range from 20 to 30° C. above the second order transition temperature, which range has hitherto been considered to be particularly favourable. Thus, a polycarbonate of 2,2-di-(4-hydroxyphenyl)-propane has a second order transition temperature of 149 to 150° C. The optimum stretching temperature for shaped elements consisting of this polycarbonate is however at 186° C., that is to say, 36–37° C. above the second order transition temperature.

It could also not be anticipated that, in contrast to other polymers, the optimum stretching temperature for shaped elements consisting of polycarbonates is restricted to a narrow temperature range and that already at temperatures slightly below and above this range, substantially less satisfactory tensile strengths are produced than within the said range.

Considered for the purposes of the process according to the invention are elements and structures such as films, foils, bands, filaments and wires of thermoplastic polycarbonates which are of high molecular weight and which simultaneously can also be crystallised. The following are mentioned as examples of such polycarbonates: the polycarbonates of 1,1-(4,4'-dihydroxydiphenyl)-ethane, 2,2-(4,4'-dihydroxydiphenyl)-propane, 2,2-(4,4'-dihydroxydiphenyl) - butane, 3,3-(4,4'-dihydroxydiphenyl)-pentane, 2,2-(4,4'-dihydroxydicresyl)-propane, mixtures of 2,2-(4,4'-dihydroxydiphenyl)-propane and 4,4'-dihydroxydiphenyl) methane, 2,2-(4,4'-dihydroxydiphenyl)-propane and 1,1-(4,4'-dihydroxydiphenyl)-cyclohexane, 2,2-(4,4'-dihydroxydiphenyl)-propane and 2,6-(dihydroxynaphthalene), 2,2-(4,4'-dihydroxydiphenyl)-propane and 4,4'-dihydroxydiphenyl, 2,2-(4,4'-dihydroxydiphenyl)-propane and hydroquinone, 2,2-(4,4'-dihydroxydiphenyl)-propane and xylene glycol, 2,2-(4,4'-dihydroxydiphenyl)-propane and 2,2-(4,4'-dihydroxydicyclohexyl)-propane, and mixtures of 4,4' - dihydroxydiphenyl sulphone, 4,4' - dihydroxydiphenyl sulphoxide, 4,4'-dihydrodiphenylether and 4,4'-dihydroxydiphenyl sulphide.

The polycarbonates of 2,2-di-(4-hydroxyphenyl)-propane are especially important for industrial uses.

The molecular weights of the polycarbonates to be used according to the invention are in the same range as those of all fibre-forming polymers. Polycarbonates with molecular weights from 20 to 150,000, more especially from 40 to 100,000 are preferred.

The preshaped elements of polycarbonates to be used for the stretching operation according to the invention can be prepared in any desired manner, for example by melt spinning, dry spinning from solution, wet spinning and, in the case of films, by the casting process. The method of producing these preshaped elements is not critical for the process of the invention.

The stretching itself can be effected by the conventional methods, but it is to be noted that the temperatures according to the invention must actually be exactly maintained. With regard to these temperatures, it is the filament temperature which is concerned and not the temperature of the heating means. It is especially desirable to heat the filament so that it assumes the temperature of the heating apparatus. In this case, the temperature can be adjusted and kept constant in a particularly favourable manner. More especially solid bodies and gases, such as air and nitrogen, are considered as heat transfer agents. It has proved especially advantageous to carry out the stretching in heated cavities. This method guarantees a particularly uniform heating of the filament. However, metal bowed members comprising a groove in which the filament moves are also to be considered and it is furthermore possible easily to ensure in this case that the filament assumes the temperature of the bowed member.

The stretching ratio depends on the polycarbonate and is generally between 1:2 and 1:8, preferably between 1:3 and 1:6. The stretching can also be effected in several stages and in this case the stretching is effected in all stages at the temperature according to the invention.

The optimum stretching temperature is determined by measuring the tangent of the dielectric loss angle of the preshaped element to be stretched. The maximum of this value differs for each shaped element of each polycarbonate. It depends on the chemical structure of the polycarobnate, the molecular weight and the physical structure of the preshaped element. The temperature range for the best possible stretching is very narrow and it extends substantially from 5° below the extrapolated maximum to 5° above. It is even more advantageous to carry out the stretching in a temperature range of ±2° C., related to the extrapolated maximum.

Using the stretching method according to the invention, the stretched elements are given a particularly high strength, which can amount to about 4.8 g./den., depending on the nature of the polycarbonate, the degree of polymerisation, the molecular weight distribution, and also depending on the pretreatment of the element to be stretched. The stretched elements also show an improved crystallinity and a lower solubility as compared with the unstretched elements.

The present invention is further disclosed in the following examples, which are illustrative but not limitative thereof.

EXAMPLE 1

1 part by weight of a polycarbonate of 2,2-di-(4-hydroxyphenyl)-propane with a mean molecular weight of 80,000 is dissolved in 4 parts by weight of methylene chloride. In accordance with the process usual for dry spinning, the solution preheated to about 60° C. is forced through spinnerets with an aperture diameter of 0.1 mm. into a shaft heated to 80° C. and the filaments, on leaving the latter, are wound at a speed of 300 m./min. These filaments are dried for 2 hours at 100° C. in order completely to remove the methylene chloride and the second order transition temperature of these filaments, determined from the dependence of the specific volume on temperature, is then at 149–150° C., while their strength is 1 g./den. and the elongation is 130%. The filaments thus produced are supplied by way of a thread brake to a pair of rollers, of which the second roller has a peripheral speed four times greater than the first. A metal chamber with a length of 25 cm. and heated by a liquid thermostat is arranged between the pair of rollers, the said chamber having a polished bore with a diameter of 1 to 2 mm. The thermostat keeps the temperature in the heating chamber constant to ±0.5° C. By means of the first roller, the filaments are introduced at a speed of 12 m./min. into the bore of the heating chamber and are withdrawn by the second roller at 48 m./min. The stretching ratio is then 1:4. The following table shows that filaments with a particularly high tensile strength are only obtained if the stretching is carried out at the same temperature at which also the tangent of the dielectric loss angle (tg δ) has a maximum ("dielectric maximum"). This is determined here by the method of Krum and Muller at 10 kc./s.

Table

| Temperature ° C. | tgδ | Tensile strength g./100 den. | Elongation percent |
| --- | --- | --- | --- |
| 150 | 2.5 | (¹) | |
| 160 | 5.0 | | |
| 170 | 8.4 | (¹) | |
| 180 | 22.1 | 250 | 22 |
| 183 | 25.2 | 320 | 27 |
| 186 | 26.0 | 330 | 33 |
| 190 | 25.0 | 340 | 38 |
| 195 | 14.8 | 290 | 40 |
| 200 | 9.0 | 260 | 43 |
| 205 | 6.3 | 240 | 48 |
| 210 | 5.0 | 220 | 50 |
| 220 | 4.0 | 180 | 50 |

¹ Filament breaks on stretching.

It will be seen from the table that tgδ is at its maximum at 186° C.±1° C. (36° C. above the second order transition temperature) and that only this stretching temperature leads to optimum tensile strengths. The maximum of the dielectric loss angle and thus the optimum stretching temperature can vary according to the nature of the polycarbonate and depending on the manufacturing conditions and the preretreatment.

EXAMPLE 2

A polycarbonate of 2,2-di-(4-hydroxy-3,3'-, 5,5'-tetrachloro-phenyl)-propane with a mean molecular weight of 60,000 is dissolved in methylene chloride; the concentration is 20%. As described in Example 1, filaments are produced from this solution by the dry spinning process. After the methylene chloride has been completely removed, the second order transition temperature of this polycarbonate is about 181° C., and the strength of the filaments is 0.9 g./den. at 100% elongation. These filaments are thereafter stretched between two rollers running at different speeds, as described in Example 1. In this case, an electrically heated metal block with a suitable bore through which the filament is drawn is used as the heating assembly. The best strength values, approximately 3.6 g./den. at 25% elongation, are produced with a stretching temperature of 251±2° C. This optimum stretching temperature is approximately 70° C. above the second order transition temperature and corresponds to the position of the "dielectric maximum" with this polycarbonate. Filaments with substantially lower strength values are obtained above and below this optimum temperature.

EXAMPLE 3

The solution of a polycarbonate of 2,2-di-(4-hydroxyphenyl)-propane, as described in Example 1, is preheated to 40° C. and, employing the process usual for dry spinning, is forced through spinnerets with an aperture diameter of 0.17 mm. into a shaft heated to 60° C. and is withdrawn at the outlet of the latter at a speed of 200 m./min. However, the winding arrangement runs at 240 m./min., so that the filaments are given a prestretching of 20%. After drying for 2 hours at 100° C., the filaments are stretched between two rollers as described in Example 1, but the first roller has a peripheral speed of 20 m./min. and the second a peripheral speed of 100 m./min., so that the stretching ratio is 1:5. The heating means comprises a slightly curved tube arranged between the two rollers, the thermostat liquid being pumped through the tube, which has at the top a continuous groove with a length of 50 cm. The filament is guided through this polished groove and heated in contact with the wall of the metal tube. The optimum stretching temperature of these filaments, prestretched in the spinning process, is 194° C.±2° C. Once again this is in the "dielectric maximum," which is here displaced relative to Example 1. The filaments stretched at this temperature have a strength factor of 4.2 g./den. and 35% elongation. Filaments stretched outside this temperature range have lower stretch values.

EXAMPLE 4

A melt polycarbonate of 2,2-di-(4-hydroxyphenyl)-propane with a mean molecular weight of 25,000 is melted at 280–290° C. by the method usual with melt spinning and forced through spinnerets with an aperture diameter of 0.3 mm. The cooled and solidified filaments are wound at a speed of 400 m./min. The lower molecular weight of these filaments spun from the melt displaced the position of the "dielectric maximum" to lower temperatures. The optimum stretching temperature of these filaments is once again in the "dielectric maximum" and is in fact at 179° C.±1° C. The tensile strength is 3.2 g./den. at 30% elongation. Filaments stretched outside this narrow range of 179° C±1° C. have strength values of only 2.3 g./den. and less.

We claim:

A process for the production of shaped elements with improved tensile strength from thermoplastic and crystallisable polycarbonates of high molecular weight by stretching in a temperature range above the second order transition temperature and below the melting point which comprises carrying out the stretching at a temperature in the range from 5° C. below to 5° C. above that temperature at which the tangent of the dielectric loss angle of the filament to be stretched has its extrapolated maximum.

References Cited in the file of this patent

UNITED STATES PATENTS 2,964,797   Peilstocker et al. _____ Dec. 20, 1960